United States Patent
Abhyankar et al.

(10) Patent No.: US 11,347,895 B2
(45) Date of Patent: May 31, 2022

(54) METHOD AND SYSTEM OF AUTHENTICATED ENCRYPTION AND DECRYPTION

(71) Applicant: Aptiv Technologies Limited, St. Michael (BB)

(72) Inventors: Ranjit V. Abhyankar, Bangalore (IN); Madhurima Lekkala, Bangalore (IN); Akhila P, Bangalore (IN); Sriram Yarlagadda, Farmington Hills, MI (US)

(73) Assignee: Aptiv Technologies Limited, St. Michael (BB)

( * ) Notice: Subject to any disclaimer, the term of this patent is extended or adjusted under 35 U.S.C. 154(b) by 175 days.

(21) Appl. No.: 16/701,261

(22) Filed: Dec. 3, 2019

(65) Prior Publication Data
US 2021/0165916 A1 Jun. 3, 2021

(51) Int. Cl.
*G06F 21/72* (2013.01)
*G06F 21/60* (2013.01)
*H04L 9/32* (2006.01)

(52) U.S. Cl.
CPC ............ *G06F 21/72* (2013.01); *G06F 21/606* (2013.01); *H04L 9/3242* (2013.01); *H04L 9/3247* (2013.01); *H04L 2209/12* (2013.01)

(58) Field of Classification Search
CPC ..... G06F 21/72; G06F 21/606; H04L 9/3242; H04L 9/3247; H04L 2209/12; H04L 2209/84; H04L 9/0643; H04L 9/0637
USPC ....................................................... 713/192
See application file for complete search history.

(56) References Cited

U.S. PATENT DOCUMENTS

| 5,144,667 | A | | 9/1992 | Pogue et al. |
| 5,345,508 | A | * | 9/1994 | Lynn ............... H04L 9/0662 380/46 |
| 5,673,319 | A | * | 9/1997 | Bellare .......... H04L 9/0637 380/259 |

(Continued)

FOREIGN PATENT DOCUMENTS

| EP | 2009543 A1 | 12/2008 |
| WO | 2018198297 | 11/2018 |

OTHER PUBLICATIONS

David McGrew, The Galois/Counter Mode of Operation (GCM), 2005, 41 pages https://csrc.nist.rip/groups/ST/toolkit/BCM/documents/proposedmodes/gcm/gcm-spec.pdf (Year: 2005).*

(Continued)

*Primary Examiner* — Shahriar Zarrineh
(74) *Attorney, Agent, or Firm* — Sawtooth Patent Group PLLC (57) ABSTRACT

A method of authenticated encryption and decryption includes generating a first digital signature with an encryption circuit of a first processor component. Concatenating the first digital signature to a plaintext message to generate a concatenated message. Encrypting the concatenated message into a ciphertext. Transmitting the ciphertext via a communications channel to a second processor component. Decrypting the ciphertext into a decrypted first digital signature and a decrypted plaintext message with a decryption circuit in the second processor component. Comparing, with the decryption circuit, the decrypted first digital signature with a second digital signature, thereby authenticating the decrypted plaintext message.

22 Claims, 7 Drawing Sheets

(56) References Cited

U.S. PATENT DOCUMENTS

| | | | | |
|---|---|---|---|---|
| 6,055,316 | A * | 4/2000 | Perlman | H04L 9/0637 380/262 |
| 6,215,876 | B1 * | 4/2001 | Gilley | H04L 9/12 380/260 |
| 7,127,067 | B1 * | 10/2006 | Wachtler | H04L 9/0833 380/255 |
| 7,189,769 | B2 * | 3/2007 | Cody | C08K 9/00 523/207 |
| 7,327,846 | B1 * | 2/2008 | Chang | H04L 9/0841 380/259 |
| 7,328,339 | B1 * | 2/2008 | Janarthanam | H04L 9/0637 380/37 |
| 8,190,894 | B2 * | 5/2012 | Sandberg | H04L 9/0643 713/170 |
| 8,218,759 | B2 * | 7/2012 | Moffat | H04L 9/0643 380/28 |
| 8,719,572 | B2 * | 5/2014 | Schertzinger | H04L 63/062 713/170 |
| 8,804,951 | B2 | 8/2014 | Gueron et al. | |
| 8,832,466 | B1 * | 9/2014 | Mcgregor, Jr | H04L 9/0618 713/193 |
| 9,407,437 | B1 * | 8/2016 | Campagna | H04L 9/16 |
| 9,519,757 | B2 * | 12/2016 | Clayton | G06F 21/602 |
| 9,537,657 | B1 * | 1/2017 | Char | H04L 9/3226 |
| 9,602,288 | B1 * | 3/2017 | Mikulski | H04L 9/3247 |
| 9,910,999 | B1 * | 3/2018 | Yu | G06F 21/6218 |
| 2002/0150241 | A1 * | 10/2002 | Scheidt | H04L 9/3231 380/44 |
| 2004/0184614 | A1 | 9/2004 | Walker et al. | |
| 2005/0094805 | A1 * | 5/2005 | Kitani | H04L 9/0662 380/28 |
| 2005/0138046 | A1 * | 6/2005 | Miettinen | G06F 21/64 |
| 2006/0034461 | A1 * | 2/2006 | Park | H04L 63/06 380/277 |
| 2007/0106896 | A1 * | 5/2007 | Sandberg | H04L 9/0637 713/170 |
| 2007/0133791 | A1 * | 6/2007 | Han | H04L 63/068 380/46 |
| 2008/0063186 | A1 * | 3/2008 | Greco | G06F 21/80 380/28 |
| 2008/0077797 | A1 * | 3/2008 | Greco | H04L 9/3247 713/176 |
| 2008/0084996 | A1 * | 4/2008 | Chen | H04L 9/0637 380/28 |
| 2008/0101613 | A1 | 5/2008 | Brunts et al. | |
| 2008/0253566 | A1 * | 10/2008 | Hidaka | H04L 9/0827 380/255 |
| 2009/0161874 | A1 * | 6/2009 | Eun | H04L 12/2856 380/277 |
| 2010/0268960 | A1 * | 10/2010 | Moffat | H04L 9/0643 713/181 |
| 2011/0246047 | A1 | 10/2011 | Smith et al. | |
| 2014/0355754 | A1 * | 12/2014 | Leung | H04L 9/065 380/28 |
| 2015/0244530 | A1 * | 8/2015 | Clayton | H04L 9/3242 713/189 |
| 2016/0080144 | A1 * | 3/2016 | Choi | H04L 9/0822 380/44 |
| 2016/0134594 | A1 * | 5/2016 | Teo | H04L 63/045 713/171 |
| 2016/0344549 | A1 * | 11/2016 | Campagna | H04L 9/3239 |
| 2017/0366340 | A1 * | 12/2017 | Wyseur | H04L 9/3242 |
| 2018/0294968 | A1 * | 10/2018 | Johnson | H04L 9/0643 |
| 2019/0044728 | A1 | 2/2019 | Karmoose et al. | |
| 2019/0081950 | A1 * | 3/2019 | Baracaldo Angel | H04L 9/3226 |
| 2019/0220721 | A1 * | 7/2019 | Chhabra | G06K 19/0724 |
| 2019/0223010 | A1 * | 7/2019 | Keranen | H04W 88/023 |
| 2019/0362054 | A1 * | 11/2019 | Diehl | H04L 9/088 |
| 2020/0052892 | A1 * | 2/2020 | Chhabra | H04L 9/3242 |
| 2020/0192822 | A1 * | 6/2020 | van Loon | G06F 12/1408 |
| 2021/0044972 | A1 * | 2/2021 | Murray | H04L 9/3271 |
| 2021/0074376 | A1 * | 3/2021 | Huott | G11C 11/4072 |
| 2021/0165916 | A1 * | 6/2021 | Abhyankar | H04L 9/3242 |

OTHER PUBLICATIONS

"Extended European Search Report", EP Application No. 20200701.9, dated Mar. 12, 2021, 9 pages.

Gligor, et al., "Fast Encryption and Authentication: XCBC Encryption and XECB Authentication Mod", Aug. 18, 2000, 36 pages.

D. McGrew and J. Viega. The Security and Performance of the Galois/Counter Mode (GCM) of Operation. Proceedings of INDOCRYPT '04, Springer-Verlag, 2004. http://eprint.iacr.org/2004/193/, Oct. 7, 2004.

U.S. Appl. No. 11/729,214, filed Mar. 28, 2007, entitled Speeding up the Computation of Message Authentication Codes for Network Communications.

National Institute of Standards and Technology (NIST) Special Publication 800-38D, Nov. 2007, Recommendation for Block Cipher Modes of Operation: Galois/Counter Mode (GCM) and GMAC, Morris Dworkin.

Basic comparison of Modes for Authenticated-Encryption (IAPM, XCBC, OCB, CCM, EAX, CWC, GCM, PCFB, CS), Petr Svenda Masaryk University in Brno, Faculty of Informatics.

* cited by examiner

METHOD AND SYSTEM OF AUTHENTICATED ENCRYPTION AND DECRYPTION

TECHNICAL FIELD OF DISCLOSURE

This disclosure generally relates to a method and system of authenticated encryption and decryption of a message.

BACKGROUND OF THE DISCLOSURE

A Galois/Counter Mode (GCM) algorithm is a widely accepted standard for authenticated encryption and decryption. However, for protecting messages on a transmission protocol with small payload sizes, the relatively large overhead of transmitting initialization vectors and authentication tags, and no security from replay attacks, may be problematic.

SUMMARY OF THE DISCLOSURE

An example of a method of authenticated encryption includes generating a first digital signature with an encryption circuit of a first processor component; concatenating the first digital signature to a plaintext message to generate a concatenated message, with the encryption circuit; encrypting, with the encryption circuit, the concatenated message into a ciphertext; and transmitting, with the first processor component, the ciphertext via a communications channel to a second processor component.

In an example having one or more features of the method of the previous paragraph, further including the step of decrypting the ciphertext, with a decryption circuit of the second processor component, into a decrypted first digital signature and a decrypted plaintext message.

In an example having one or more features of the method of the previous paragraph, further including the step of comparing, with the decryption circuit, the decrypted first digital signature with a second digital signature, thereby authenticating the decrypted plaintext message.

In an example having one or more features of the method of any of the previous paragraphs, wherein the second digital signature is generated by the decryption circuit using a message authentication code (MAC) of the decrypted plaintext message.

In an example having one or more features of the method of any of the previous paragraphs, wherein the first digital signature is generated by the encryption circuit using a message authentication code (MAC) of the plaintext message.

In an example having one or more features of the method of any of the previous paragraphs, wherein the step of encrypting the first digital signature further includes the step generating a secure initialization vector (SIV).

In an example having one or more features of the method of any of the previous paragraphs, wherein the SIV is incremented by the encryption circuit after the ciphertext is transmitted to the decryption circuit.

In an example having one or more features of the method of any of the previous paragraphs, wherein the encryption circuit shares the SIV with the decryption circuit, thereby creating a local SIV in the decryption circuit.

In an example having one or more features of the method of any of the previous paragraphs, wherein the encryption circuit extracts a portion of the SIV and concatenates the portion of the SIV to the ciphertext.

In an example having one or more features of the method of any of the previous paragraphs, wherein the decryption circuit extracts a portion of the local SIV and compares the portion of the local SIV with the portion of the SIV concatenated to the ciphertext.

In an example having one or more features of the method of any of the previous paragraphs, wherein when the portion of the local SIV matches the portion of the SIV concatenated to the ciphertext, the decryption circuit decrypts the ciphertext.

In an example having one or more features of the method of any of the previous paragraphs, wherein when the portion of the local SIV does not match the portion of the SIV concatenated to the ciphertext, the decryption circuit determines a difference between the portion of the local SIV and the portion of the SIV concatenated to the ciphertext.

In an example having one or more features of the method of any of the previous paragraphs, wherein when the difference is less than a threshold, the decryption circuit increments the portion of the local SIV by a quantity to match the portion of the SIV concatenated to the ciphertext, and decrypts the ciphertext.

In an example having one or more features of the method of any of the previous paragraphs, wherein the decryption circuit further increments the local SIV by the same quantity as the portion of the local SIV is incremented.

In an example having one or more features of the method of any of the previous paragraphs, wherein when the difference is greater than a threshold, the encryption circuit and the decryption circuit begin a new encryption and decryption session.

In an example having one or more features of the method of any of the previous paragraphs, wherein the local SIV is incremented by the decryption circuit after the ciphertext is decrypted and authenticated.

In an example having one or more features of the method of any of the previous paragraphs, wherein the step of encrypting the first digital signature further includes the step generating a key.

In an example having one or more features of the method of any of the previous paragraphs, wherein the encryption circuit shares the key with the decryption circuit.

In an example having one or more features of the method of any of the previous paragraphs, wherein the decryption circuit shares the key with the encryption circuit.

In an example having one or more features of the method of any of the previous paragraphs, wherein the decryption circuit shares the local SIV with the encryption circuit, thereby creating a SIV in the encryption circuit.

An example of an authenticated encryption and decryption system, the system includes a first processor component having an encryption circuit configured to generate a first digital signature; wherein the encryption circuit is further configured to: concatenate the first digital signature to a plaintext message to generate a concatenated message; encrypt the concatenated message into a ciphertext; whereby the first processor component transmits the ciphertext via a communications channel to a second processor component.

In an example having one or more features of the system of the previous paragraph, the system further includes the second processor component having a decryption circuit configured to decrypt the ciphertext into a decrypted first digital signature and a decrypted plaintext message.

In an example having one or more features of the system of the previous paragraph, the decryption circuit compares the decrypted first digital signature with a second digital signature, thereby authenticating the decrypted plaintext message.

In an example having one or more features of the system of the previous paragraph, wherein the decryption circuit generates the second digital signature by using a message authentication code (MAC) of the decrypted plaintext message.

In an example having one or more features of the system of any of the previous paragraphs, the encryption circuit generates the first digital signature by using a message authentication code (MAC) of the plaintext message.

In an example having one or more features of the system of any of the previous paragraphs, the decryption circuit generates a local SIV and shares the local SIV with the encryption circuit, thereby creating a SIV in the encryption circuit.

In an example having one or more features of the system of any of the previous paragraphs, the encryption circuit further generates a secure initialization vector (SIV) in addition to encrypting the first digital signature.

In an example having one or more features of the system of any of the previous paragraphs, the encryption circuit increments the SIV after the ciphertext is transmitted to the decryption circuit.

In an example having one or more features of the system of any of the previous paragraphs, the encryption circuit shares the SIV with the decryption circuit, thereby creating a local SIV in the decryption circuit.

In an example having one or more features of the system of any of the previous paragraphs, the encryption circuit extracts a portion of the SIV and concatenates the portion of the SIV to the ciphertext.

In an example having one or more features of the system of any of the previous paragraphs, the decryption circuit extracts a portion of the local SIV and compares the portion of the local SIV with the portion of the SIV concatenated to the ciphertext.

In an example having one or more features of the system of any of the previous paragraphs, when the portion of the local SIV matches the portion of the SIV concatenated to the ciphertext, the decryption circuit decrypts the ciphertext.

In an example having one or more features of the system of any of the previous paragraphs, when the portion of the local SIV does not match the portion of the SIV concatenated to the ciphertext, the decryption circuit determines a difference between the portion of the local SIV and the portion of the SIV concatenated to the ciphertext.

In an example having one or more features of the system of any of the previous paragraphs, when the difference is less than a threshold, the decryption circuit increments the portion of the local SIV by a quantity to match the SIV concatenated to the ciphertext, and decrypts the ciphertext.

In an example having one or more features of the system of any of the previous paragraphs, the decryption circuit further increments the local SIV by the same quantity as the portion of the local SIV is incremented.

In an example having one or more features of the system of any of the previous paragraphs, when the difference is greater than a threshold, the encryption circuit and the decryption circuit begin a new encryption and decryption session.

In an example having one or more features of the system of any of the previous paragraphs, the decryption circuit increments the local SIV after the ciphertext is decrypted and authenticated.

In an example having one or more features of the system of any of the previous paragraphs, the step of encrypting the first digital signature further includes the step generating a key.

In an example having one or more features of the system of any of the previous paragraphs, the encryption circuit shares the key with the decryption circuit.

In an example having one or more features of the system of any of the previous paragraphs, the decryption circuit shares the key with the encryption circuit.

In an example having one or more features of the system of any of the previous paragraphs, the decryption circuit shares the local SIV with the encryption circuit, thereby creating a SIV in the encryption circuit.

In an example having one or more features of the system of any of the previous paragraphs, the encryption circuit generates a key and shares the key with the decryption circuit.

In an example having one or more features of the system of any of the previous paragraphs, the decryption circuit generates a key and shares the key with the encryption circuit.

BRIEF DESCRIPTION OF DRAWINGS

The present invention will now be described, by way of example with reference to the accompanying drawings, in which.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

The United States National Institute of Standards and Technology (NIST) Special Publication 800-38D, issued November, 2007, entitled, RECOMMENDATION FOR BLOCK CIPHER MODES OF OPERATION: GALOIS/ COUNTER MODE (GCM) AND GMAC, specifies the Galois/Counter Mode (GCM), an algorithm for authenticated encryption with associated data, and its specialization, GMAC, for generating a Message Authentication Code on data that is not encrypted. GCM and GMAC are modes of operation for an underlying approved symmetric key block cipher. Authenticated encryption (AE) and authenticated encryption with associated data (AEAD) are forms of encryption which simultaneously assure the confidentiality and authenticity of data. GCM is a symmetric-key block cipher mode of operation in cryptography which relies on AE. GCM is constructed from an approved symmetric key block cipher with a block size of 128 bits, such as the Advanced Encryption Standard (AES) algorithm that is specified in Federal Information Processing Standard (FIPS) Pub. 197. GCM is a mode of operation of the AES algorithm.

GCM is a widely accepted standard for authenticated encryption because of its efficiency and performance. However, for protecting messages on a transmission protocol with relatively small payload sizes (typical in embedded systems in vehicles), the overhead of transmission of initialization vectors (IV) and authentication tags (Tags) is relatively high. An example of a transmission protocol with a relatively small payload size is the Controller Area Network (CAN) communication between different control units and/or devices in a vehicle sub-system. As will be described in more detail below, a modified GCM scheme disclosed herein addresses two issues of GCM; 1) the additional overhead of transmitting IV and Tags; and 2) little to no protection from replay attacks.

Figure 1A:
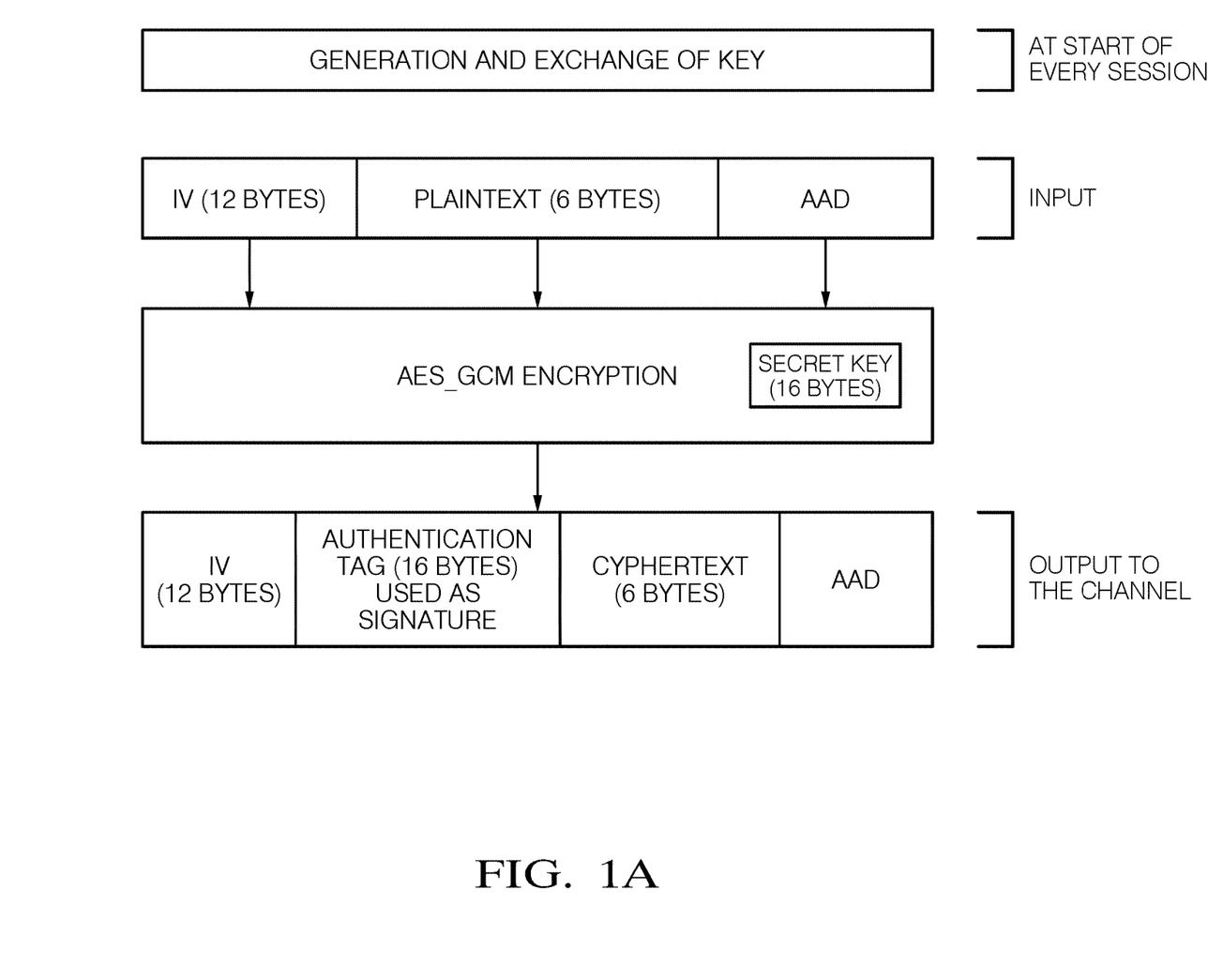
FIG. 1A is an illustration of a logic flow of a Galois/Counter Mode (GCM) encryption process in accordance with one embodiment.

FIG. 1A illustrates an example of a GCM encryption logic flow. A GCM key is the block cipher key (i.e., a secret key, secure key, etc.). The exchange of the key is done via any of the known security protocols, such as Public Key Infrastructure (PKI) or Diffie-Hellman key exchange. For any given key, the underlying block cipher consists of two functions that are inverses of each other. The two functions are authenticated encryption and authenticated decryption. The authenticated encryption function encrypts the confidential data and computes the Tag on both the confidential data and any additional, non-confidential data. Examples of confidential data for encryption in a vehicle system include, but are not limited to, inertial measurement unit (IMU) data shared over CAN network to an autonomous drive engine control unit (ECU), radar and/or LiDAR sensor data shared with the host ECU running safety applications. Examples of non-confidential data for encryption in the vehicle system include, but are not limited to, a message identifier (CAN communications), an IP Address and/or Port Numbers (ethernet communication).

Figure 1B:
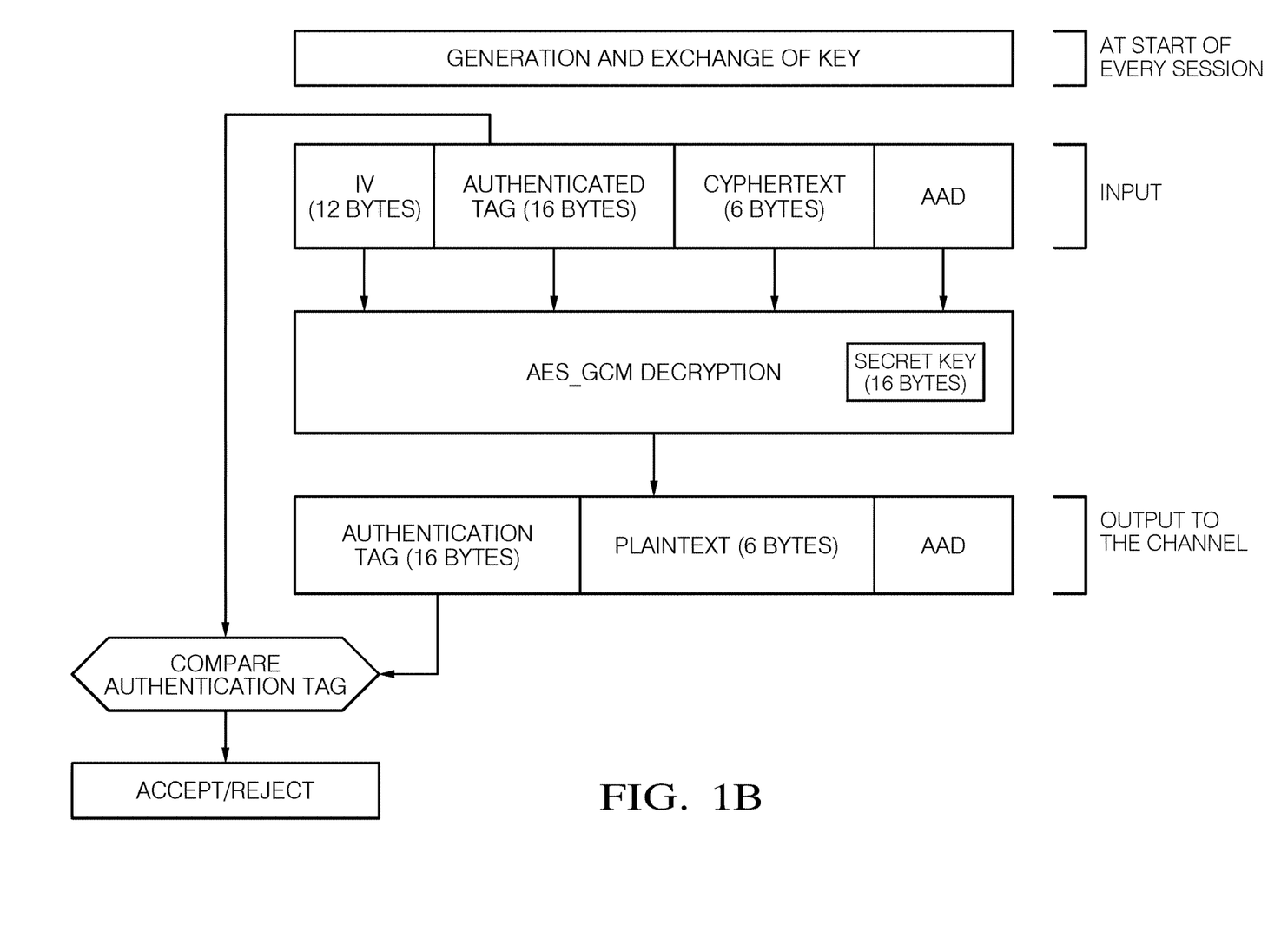
FIG. 1B is an illustration of a logic flow of a Galois/Counter Mode (GCM) decryption process in accordance with one embodiment.

FIG. 1B illustrates an example of a GCM decryption logic flow. The authenticated decryption function decrypts the confidential data and authenticates the sender based on verification of the Tag. In this example, the output of the authenticated decryption function includes the plaintext message that corresponds to the ciphertext (assuming the Tag verification is successful), and the Tag verification result (i.e., PASS/FAIL). The ciphertext is the result of encrypting a plaintext message.

Examples of some of the limitations of the GCM method include:
Message Transmission Overheads:
The output from the GCM encryption process includes the Tag of symmetric-key size. In addition to transmitting the ciphertext and the Tag, the IV (with NIST recommended length of 12 bytes) also needs to be transmitted to aid the eventual decryption process. When AES GCM is adopted for the CAN bus communication, which has a max payload size of 8 bytes, transmitting the Tag and IV are significant overheads (i.e. 4 extra CAN frames to carry IV and Tag for every message of CAN). If shorter length Tags are used, the overhead could only be reduced to 3 extra frames for every frame of payload. Even in case of CAN-FD, 28 bytes of IV and Tag are significant overheads (e.g., 44% of total payload of 64 bytes).
Fragmentation:
In addition to increasing the data bus load, there is overhead of synchronization of multiple frame messages (e.g., ciphertext, IV, and Tag) which introduces latency and performance issues.
Replay Attacks:
If an attacker eavesdrops on the data on bus, captures the data and replays it to the receiver, the receiver cannot differentiate the retransmitted message from the original message. This necessitates the inclusion of an additional data field in the payload (e.g., a counter in Secure CAN implementation or a timestamp) which increases network overhead.
Message Drops:
GCM, being a pure AEAD scheme provides no resistance from message drops. Message loss handling is left to the underlying network layer.

Figure 2:
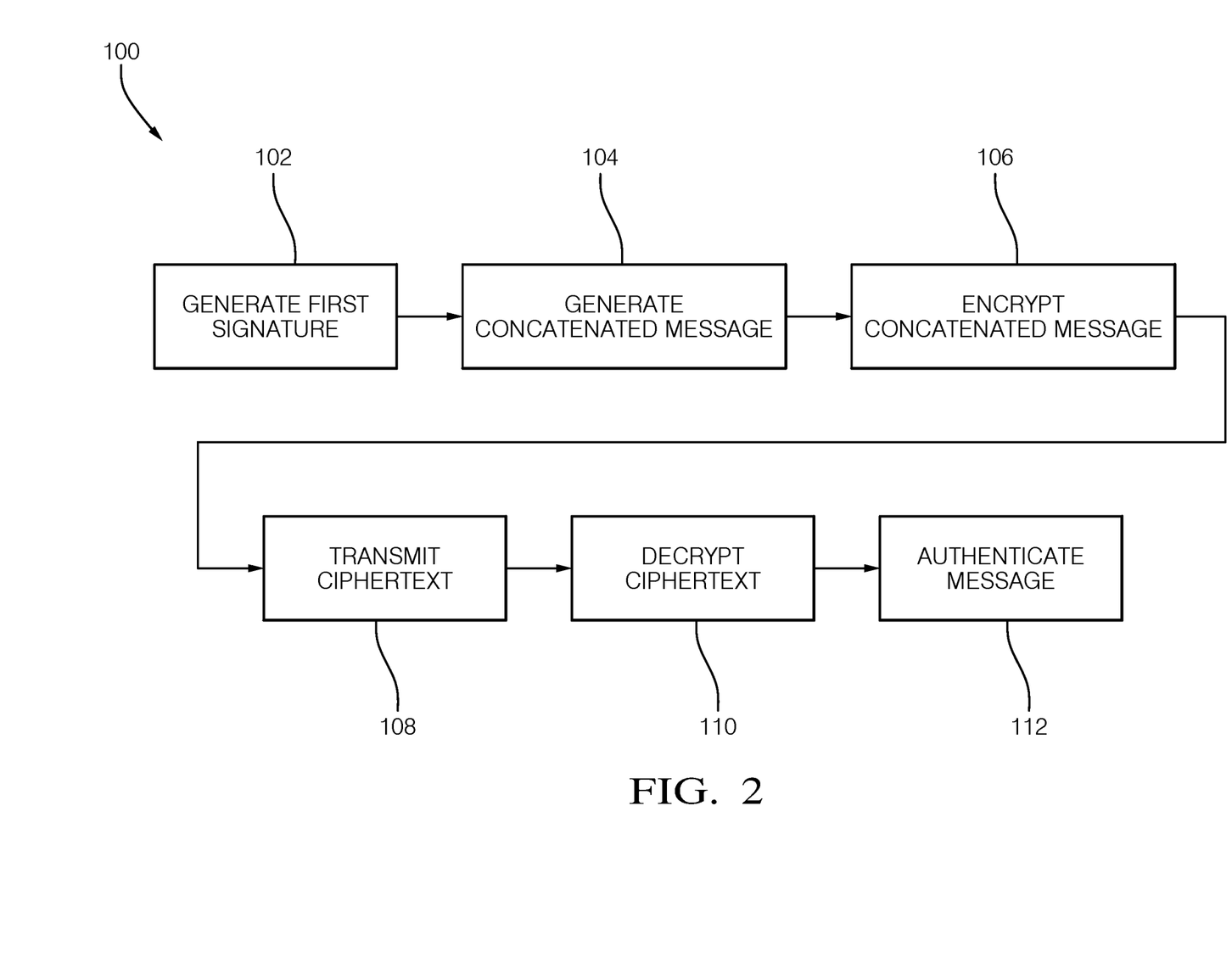
FIG. 2 is a flow chart of a method of authenticated encryption and decryption in accordance with another embodiment.
Figure 6:
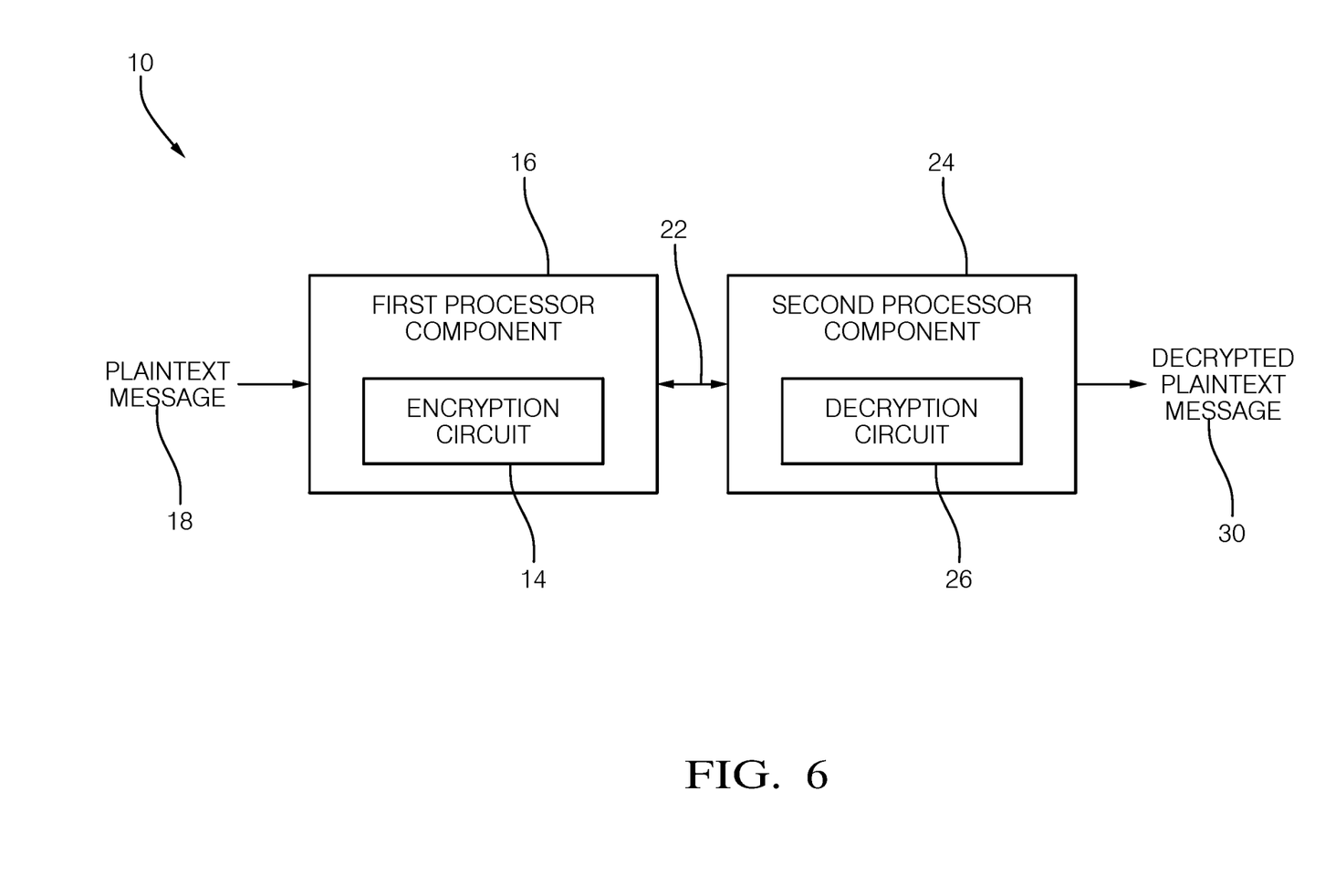
FIG. 6 is an illustration of an authenticated encryption and decryption system in accordance with yet another embodiment.

FIG. 2 is a flow chart illustrating a method 100 of authenticated encryption and decryption using a system of authenticated encryption and decryption 10, hereafter the system 10. An example of the system 10 is illustrated in FIG. 6. As will be explained in more detail below, the method 100 may offer improvements over other methods because the method 100 reduces an overhead associated with transmitting IVs and Tags, and secures from replay attacks. For illustration purposes only, the examples in the following disclosure assume a CAN bus with a data size (i.e., a plaintext message 18) of 6 bytes, and a 16 byte key size. It will be appreciated that the method 100 will apply to other communication protocols having different maximum payloads.

Figure 3:
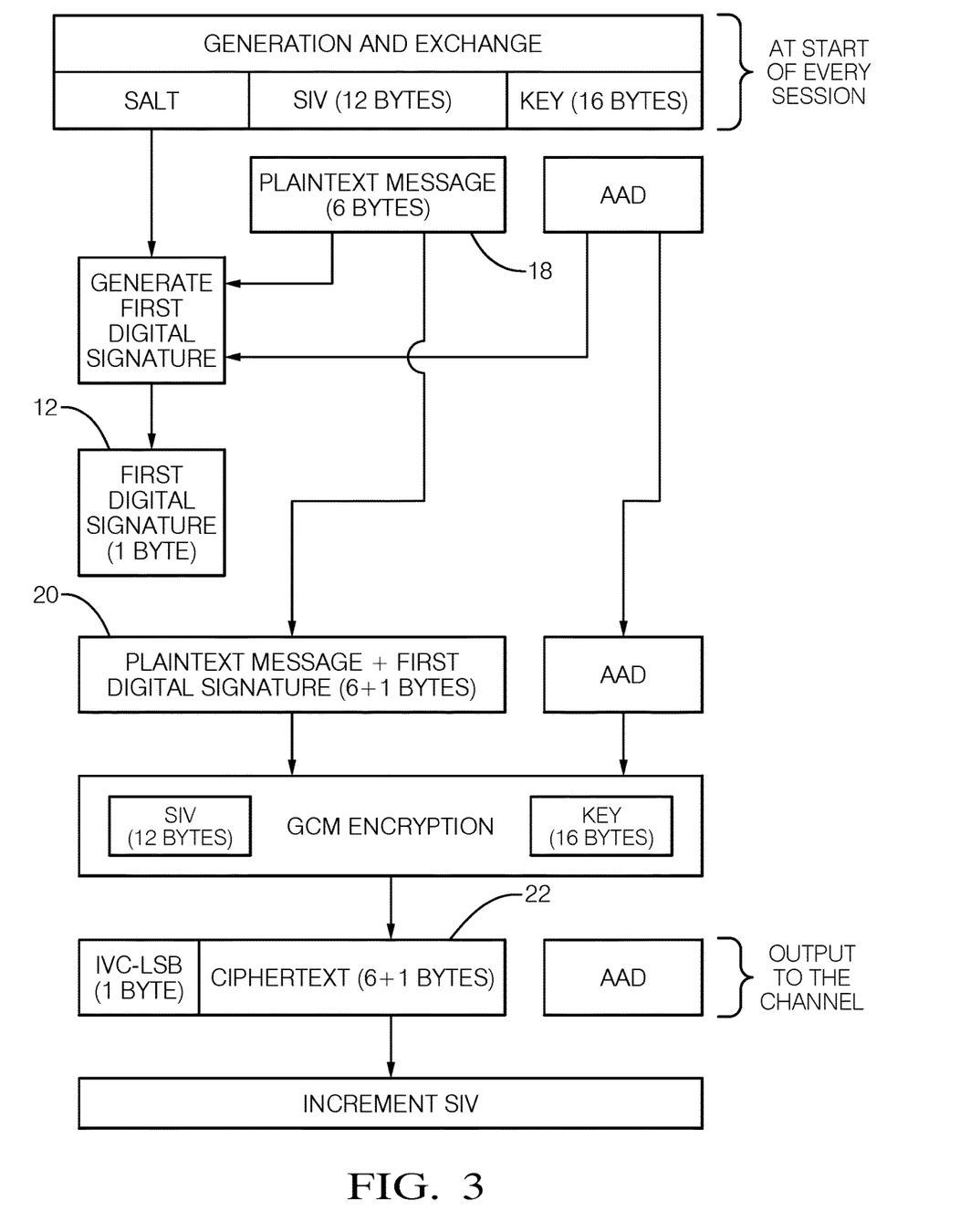
FIG. 3 is an illustration of a logic flow of an encryption process in accordance with another embodiment.

Step 102, GENERATE FIRST SIGNATURE, includes generating a first digital signature 12 with an encryption circuit 14 of a first processor component 16. FIG. 3 illustrates an example of a logic flow that occurs within the encryption circuit 14. In an example, the first digital signature 12 is generated by the encryption circuit 14 using a message authentication code (MAC) of the plaintext message 18. In this example, the plaintext message 18 is 6 bytes in length. In an example, the output of the MAC (i.e., the plaintext message 18 and any optional fields) can be reduced to the desired size using a "salt", or any other known means. A "salt" in cryptography, is random data that is used as an additional input to a one-way function that "hashes" data, a password or passphrase. MAC algorithms (e.g., Galois MAC (GMAC), hash-based MAC (HMAC), and cipher-based MAC (CMAC)), are used to derive digital signatures. In this example, the GMAC algorithm is used to generate the first digital signature 12 having a length of 1 byte. The first digital signature 12 is derived from the GMAC of the plaintext message 18 and any additional inputs. Depending on the length of the plaintext message 18 (i.e. the message payload size), the size of first digital signature 12 can be varied to ensure the maximum possible assurance of integrity and authenticity. In order to generate first digital signature 12, a first step is to generate the GMAC. In this example, the inputs used by the encryption circuit 14 to generate the GMAC include the plaintext message 18, any additional authenticated data (AAD), a secure initialization vector (SIV), an initialization vector counter (IVC), and the "salt". In the example of CAN communications, the AAD may be a message identifier. In an example of an ethernet communication, the AAD may be IP Address, and/or Port Numbers. The salt is an array of pointers to the bit locations in GMAC. The number of array pointers required to form the first digital signature 12 depends on the size of the first digital signature 12. In an example, if the GMAC is 16 bytes (i.e. 128 bits) and the first digital signature 12 is 1 byte (i.e. 8 bits), the salt will have 8 pointers agreed upon between the encryption circuit 14 and the decryption circuit 26 during a handshake process. In this example, these 8 pointers point to particular bit locations in the GMAC. The bit values at the locations pointed to by the 8 pointers are concatenated together to form the 1 byte first digital signature 12. The salt is securely exchanged at the beginning of every encryption/decryption session between the encryption circuit 14 and the decryption circuit 26.

In an example, the first processor component 16 is a microprocessor. The microprocessor may be a component of a controller circuit and/or part of a microcontroller, such as an engine control module, a body control module, and/or other circuitry associated with various sensors and actuators that may be installed on a vehicle (not shown). The microprocessor may include other control circuitry such as analog and/or digital control circuitry. The control circuitry may include one or more application-specific integrated circuits (ASICs) or field programmable gate arrays (FPGAs) that are programmed to perform the techniques, or may include one or more general purpose hardware processors programmed to perform the techniques pursuant to program instructions in firmware, memory, other storage, or a combination. The microprocessor may also combine custom hard-wired logic, ASICs, or FPGAs with custom programming to accomplish the techniques. The microprocessor may include a memory or storage media (not shown), including non-volatile memory, such as electrically erasable programmable read-only memory (EEPROM) for storing one or more routines, thresholds, and captured data. The EEPROM stores data and allows individual bytes to be erased and reprogrammed by applying special programming signals. The microprocessor may include other examples of non-volatile memory, such as flash memory, read-only memory (ROM), programmable read-only memory (PROM), and erasable programmable read-only memory (EPROM). The microprocessor may include volatile memory, such as dynamic random-access memory (DRAM), static random-access memory (SRAM). The one or more routines may be executed by the microprocessor to perform steps for encryption based on signals received by the microprocessor from the encryption circuit 14 as described herein. In an example, the first processor component 16 includes the encryption circuit 14 (i.e., the encryption circuit 14 is integral to the first processor component 16 electrical packaging). In another example, the first processor component 16 and the encryption circuit 14 are separate devices.

In another example, the first processor component 16 is a Hardware Security Module (HSM) that may be a component of a controller circuit. HSMs are hardened, tamper-resistant hardware devices that strengthen encryption practices by generating keys, encrypting and decrypting data, and creating and verifying digital signatures. In an example, the HSM includes a central processor unit (CPU), hardware accelerators for AES, Hash and Public Key Cryptography, dedicated RAM and Flash memory, and a Random Number Generator. In an example, the HSM can access the entire system RAM and Flash memory of the controller circuit, while the RAM and Flash memory in the HSM cannot be accessed by any system component other than the HSM. In this example, protection is provided to the security artifacts such as keys, and certificates that may be stored in the HSM. In an example, the operations performed in the HSM are protected from the outside world. In an example, the controller circuit submits crypto requests to the HSM which performs these operations in a safe environment, and provides the result to the controller circuit.

Figure 4A:
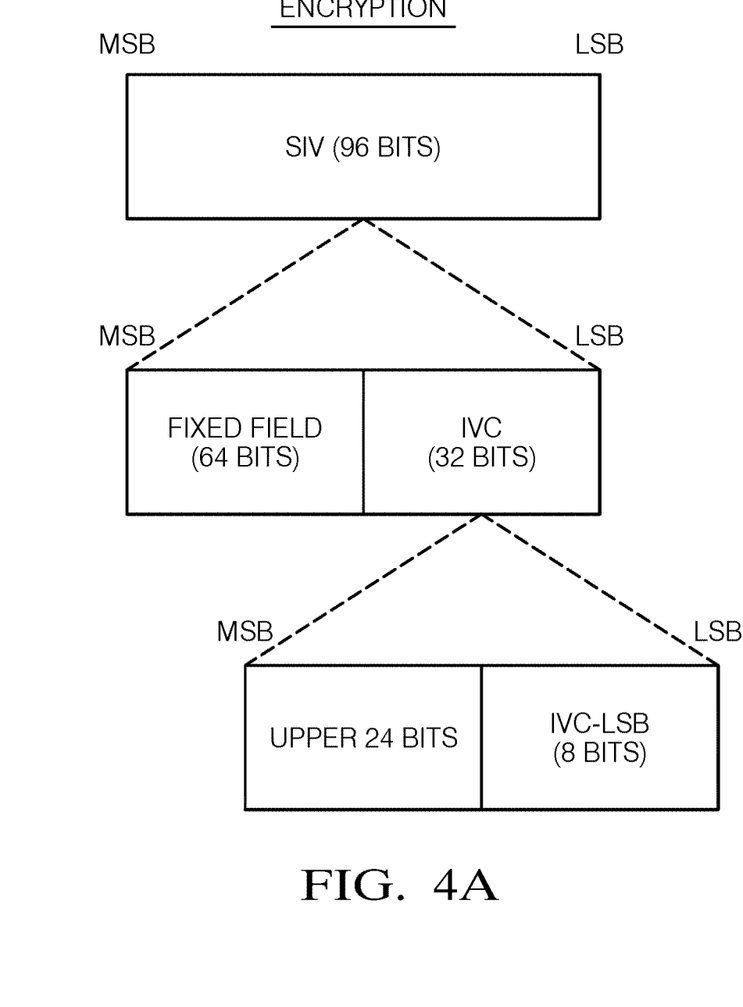
FIG. 4A is an illustration of a partitioning of a secure initialization vector in accordance with another embodiment.
Figure 4B:
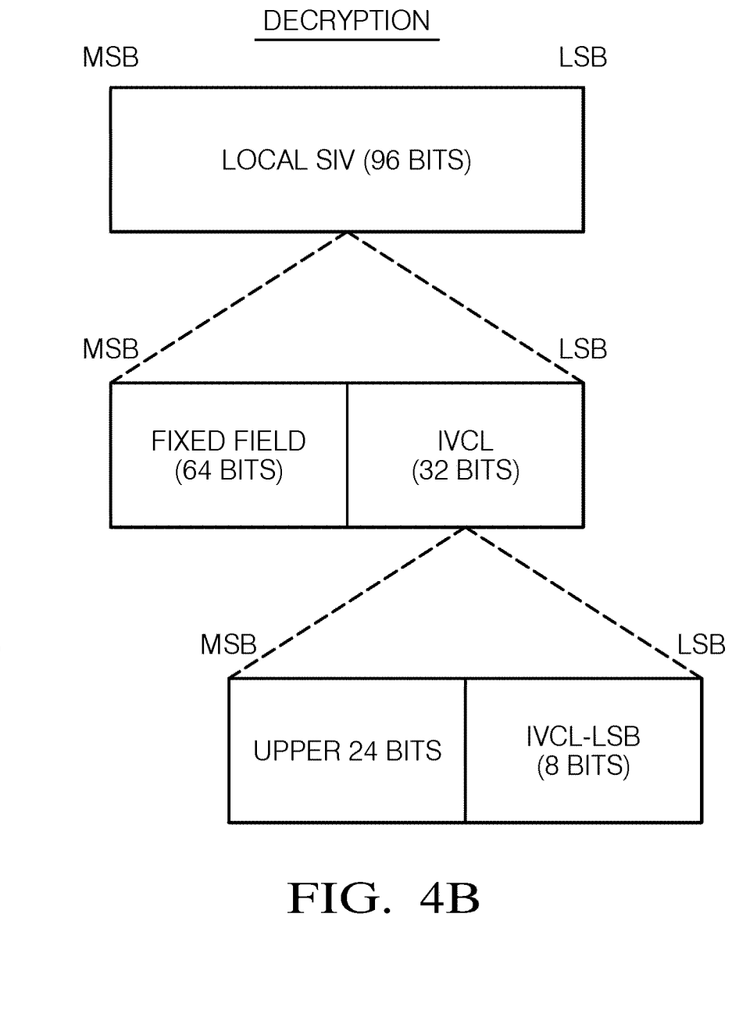
FIG. 4B is an illustration of a partitioning of a local secure initialization vector in accordance with another embodiment.

In an example, the encryption circuit 14 also generates a secure initialization vector (SIV) at the start of an encryption session. In another example, decryption circuit 26 generates a local secure initialization vector (local SIV) and shares it with the encryption circuit 14. As used herein, the SIV is "secure", compared to the GCM method, because the SIV is not transmitted on a communication channel along with the encrypted plaintext message 18. In the examples illustrated in FIGS. 3 and 4, the SIV and local SIV are 12 bytes in length. As will be described in more detail below, the SIV is securely exchanged between the first processor component 16 and a second processor component 24 by any of the known methods including, but not limited to, PKI or Diffie-Hellman key exchange. In an example, the SIV and local SIV can be used as an "optional field" in the generation of the first digital signature 12 and a second digital signature 32. In an example of deterministic construction of the SIV and the local SIV, the SIV and local SIV are the concatenation of two fields, called the fixed field and the variable field. The fixed field identifies a device (e.g., a sensor, microcontroller, etc.), or the context for the instance of the authenticated encryption function. The variable field identifies the sets of inputs to the authenticated encryption or decryption function in the particular device. In order to be compliant with the uniqueness requirement on the SIVs from the NIST recommendations referenced above, for any given key, no two distinct devices share the same fixed field, and no two distinct sets of inputs to any single device share the same variable field. The variable field typically is either 1) an integer counter, or 2) a linear feedback shift register that is driven by a primitive polynomial to ensure a maximal cycle length. In either case, the variable field increments upon each invocation of the authenticated encryption or decryption function. The lengths and positions of the fixed field and the variable field are fixed for each supported SIV length for the life of the key. Examples of the partitioning of the SIV and local SIV are illustrated in FIGS. 4A and 4B, respectively. In these examples, with the SIV and local SIV length of 12 bytes (i.e., 96 bits), the leading 64 bits (i.e., leftmost, or most significant bits—MSB) of the SIV and local SIV hold the fixed field, and the trailing 32 bits (i.e., rightmost, or least significant bits—LSB) hold the variable field. In these examples, the variable field is used as a counter, termed an initialization vector counter (IVC), and initialization vector counter local (IVCL). As will be described in more detail below, a role of the IVC and IVCL is to create a mechanism by which the encryption protocol is resistant to replay attacks, spoofing, tampering, information disclosure and message loss. It will be appreciated that other lengths and partitioning of the SIV and local SIV may be used besides the examples described herein.

In another example the encryption circuit 14 generates the key and shares the key with the decryption circuit 26. In another example, decryption circuit 26 generates the key and shares the key with the encryption circuit 14. The key can be generated using a random number generator (RNG), such as true random number generator hardware typically available in most HSM blocks, or an equivalent software implementation. The RNG can also be used to generate the SIV. Other methods for generating the key are described in the NIST document referenced above.

Step 104, GENERATE CONCATENATED MESSAGE, includes concatenating the first digital signature 12 to the plaintext message 18 to generate a concatenated message 20, with the encryption circuit 14. Referring again to FIG. 3, the 1 byte of first digital signature 12 string is attached to (i.e., concatenated to) the 6 byte plaintext message 18 string to create the concatenated message 20 having a length of 7 bytes. This concatenated message 20 has a much smaller overhead compared to the example of the GCM method shown in FIG. 1A, that has the overhead of 18 bytes.

Step 106, ENCRYPT CONCATENATED MESSAGE, includes encrypting, with the encryption circuit 14, the concatenated message 20 into a ciphertext 22. In the example illustrated in FIG. 3, the encryption of the concatenated message 20 follows the known GCM encryption protocol, and will not be described in detail herein. Details of the GCM encryption algorithms may be found in the NIST document referenced above.

Step 108, TRANSMIT CIPHERTEXT, includes transmitting, with the first processor component 16, the ciphertext 22 via a communications channel to the second processor component 24. In an example, the second processor component 24 is another microprocessor. This microprocessor may be a component of another controller circuit and/or part of another microcontroller, as described above for the first processor component 16. In another example, the second processor component 24 is another HSM that may be a component of another controller circuit, as described above for the first processor component 16. In the example of the system 10 illustrated in FIG. 6, the ciphertext 22 is transmitted over the CAN bus, which may be an unsecured line of transmission. It will be appreciated that other communication protocols, having standard wireless and/or wired interfaces, may be used to transmit the ciphertext 22 including, but not limited to, BLUETOOTH®, Wi-Fi, NFC, universal serial bus (USB), Apple Lightning, universal asynchronous receiver/transmitter (UART), etc.

In an example, prior to transmitting the ciphertext 22 to the second processor component 24, the encryption circuit 14 extracts a portion of the SIV and concatenates this portion of the SIV to the ciphertext 22. Referring back to FIG. 4A, the encryption circuit 14 extracts the rightmost 8 bits, or least significant bits (LSB) of the IVC, hereafter referred to as the IVC-LSB, and concatenates the IVC-LSB to the ciphertext 22 as illustrated in FIG. 3. Referring again to the example illustrated in FIG. 3, the first processor component 16 transmits the message containing the 6 byte ciphertext 22, along with an overhead of 2 bytes that includes the 1 byte first digital signature 12 and the 1 byte IVC-LSB. As will be described in more detail below, this transmitted IVC-LSB will be used in a decryption process, and for synchronization between the encryption circuit 14 and the decryption circuit 26.

Referring back to FIG. 3, after transmitting the ciphertext 22 to the decryption circuit 26 of the second processor component 24, the encryption circuit 14 increments the variable field of the SIV (i.e., the IVC portion of the SIV). This increment may be any pre-determined increment pattern and may be user defined.

Figure 5:
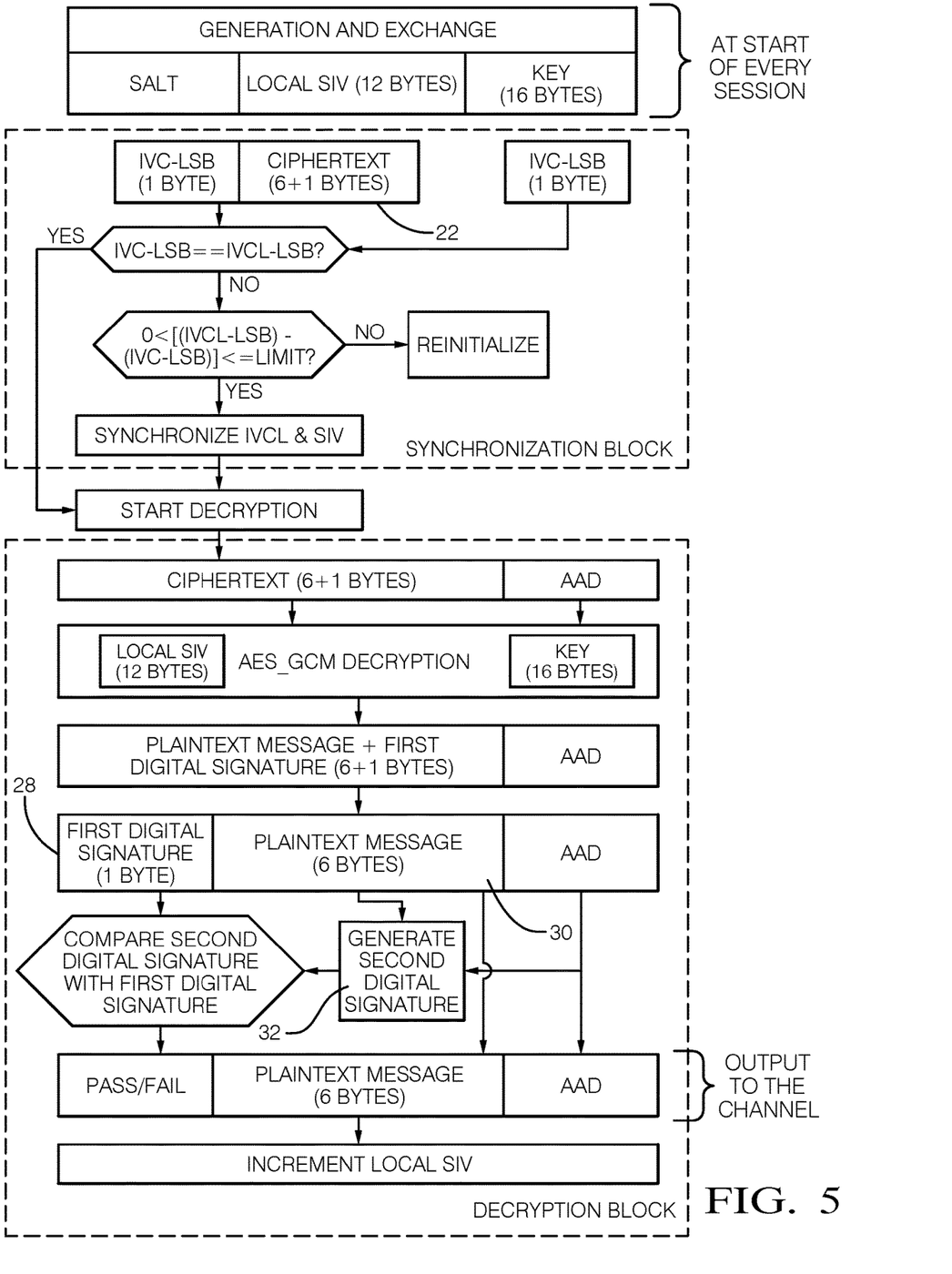
FIG. 5 is an illustration of a logic flow of a decryption process in accordance with another embodiment.

Step 110, DECRYPT CIPHERTEXT, includes decrypting the ciphertext 22, with the decryption circuit 26 of the second processor component 24, into a decrypted first digital signature 28 and a decrypted plaintext message 30. FIG. 5 illustrates an example of a logic flow of the decryption process that occurs in the decryption circuit 26. In an example, at the start of each encryption/decryption session, the encryption circuit 14 shares the SIV with the decryption circuit 26 in a secure manner separate from the ciphertext 22 (e.g., via PKI, or Diffie-Hellman key exchange), thereby creating a local copy of the SIV in the decryption circuit 26, hereafter the local SIV. In another example, the decryption circuit 26 initiates the exchange of the local SIV with the encryption circuit 14.

In an example, the decryption circuit 26 extracts a portion of the local SIV and compares the portion of the local SIV with the portion of the SIV (i.e., the IVC-LSB) concatenated to the ciphertext 22. Just as the encryption circuit 14 extracts the IVC-LSB from the SIV, as described above and illustrated in FIG. 4A, the decryption circuit extracts the LSB of the IVCL (i.e., the IVCL-LSB) from the local SIV for comparison (see FIG. 4B). Referring again to the partitioning diagram of FIG. 4B, the decryption circuit 26 extracts the IVCL-LSB for comparison to the IVC-LSB that is transmitted from the encryption circuit 14 with the ciphertext 22. That is, the decryption circuit 26 compares the IVCL-LSB to the IVC-LSB as a security check before proceeding with the decryption of the ciphertext 22. This security check protects against replay attacks, spoofing, tampering, information disclosure, and message loss. In an example, when the IVCL-LSB matches the IVC-LSB, the decryption circuit 26 decrypts the ciphertext 22. In this example, the local SIV is incremented by the decryption circuit 26 after the ciphertext 22 is decrypted and authenticated to synchronize the local SIV in the decryption circuit 26 with the SIV in the encryption circuit 14. That is the IVCL is incremented by the decryption circuit 26 to match the increment of the IVC performed by the encryption circuit 14 as described above.

In an example, when the IVCL-LSB does not match the IVC-LSB, the decryption circuit 26 determines a difference between the IVCL-LSB and the IVC-LSB. In this example, when the difference is less than a threshold, the decryption circuit 26 increments the IVCL-LSB by a quantity to match the IVC-LSB, and decrypts the ciphertext 22. In this example, the decryption circuit 26 further increments the local SIV by the same quantity as the IVCL-LSB is incremented to synchronize IVCL in the decryption circuit 26 with the SIV in the encryption circuit 14. The threshold may be user defined, and a range of the threshold depends on the application. For example, in the case of navigation by GPS, a few packet drops of GPS data may be tolerable, while in the case of navigation by dead reckoning, a loss of 2-3 IMU data packets is the most that may be tolerated. This aspect of the system 10 provides resistance to message drops and/or message corruption by correcting small differences in the IVC and IVCL, or by terminating the encryption/decryption session.

In an example, when the difference between the IVCL-LSB and the IVC-LSB is greater than the threshold, the encryption circuit 14 and the decryption circuit 26 begin a new encryption and decryption session. In this example, this situation is considered to be beyond recovery and re-initialization is started. During re-initialization, the key, SIV, and salt are freshly generated and shared to between the encryption circuit 14 and the decryption circuit 26 to restart the encryption and decryption process.

Step 112, AUTHENTICATE MESSAGE, includes comparing, with the decryption circuit 26, the decrypted first digital signature 28 with a second digital signature 32, thereby authenticating the decrypted plaintext message 30.

In an example, the second digital signature 32 is generated by the decryption circuit 26 using a MAC of the decrypted plaintext message 30 by a similar process as that for the first digital signature 12 described above. Once the decrypted plaintext message 30 is authenticated, it may be output to a channel to be read by another device, as required by the application. In an example, replay attacks will fail because a retransmitted message will fail the authentication. In this example, the SIV which is used to create the retransmitted message will not match the local SIV (which increments with every received message) used to decrypt the message, thereby creating a signature mismatch.

Accordingly, a method 100 of authenticated encryption and decryption, and an authenticated encryption and decryption system 10 are provided. The method 100 may provide advantages over other methods because the method 100 reduces the overhead of transmitted data and increases the security of the encryption and decryption messages. In addition, because the transmitted overhead is relatively small, message splitting may be avoided. For example, with 6 bytes of payload, the authenticated message may be contained in one CAN message, compared to GCM which requires 4 CAN messages. While the examples of the method 100 and system 10 described herein include application to the GCM scheme of AEAD, it will be appreciated that the method 100 and system 10 may also be applied to other AEAD schemes, including Counter with Cipher Block Chaining Message Authentication Code (CCM mode), Offset Codebook Mode (OCB mode), and Carter-Wegman+ CTR Mode (CWC mode).

While this invention has been described in terms of the preferred embodiments thereof, it is not intended to be so limited, but rather only to the extent set forth in the claims that follow. "One or more" includes a function being performed by one element, a function being performed by more than one element, e.g., in a distributed fashion, several functions being performed by one element, several functions being performed by several elements, or any combination of the above. It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact. The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

We claim:

1. A method of authenticated encryption, comprising:
generating, with an encryption circuit of a first processor component, a first digital signature associated with a secure initialization vector (SIV);
concatenating, with the encryption circuit, the first digital signature to a plaintext message to generate a concatenated message;
encrypting, with the encryption circuit, the concatenated message into a ciphertext;
extracting, with the encryption circuit, a portion of the SIV;
concatenating the extracted portion of the SIV to the ciphertext;
transmitting, with the first processor component and via a communications channel to a second processor component, the ciphertext and the concatenated portion of the SIV to enable a decryption circuit of the second processor component to authenticate plaintext messages;
generating, with the decryption circuit, a local SIV;
decrypting, with the decryption circuit, the ciphertext into a decrypted first digital signature and a decrypted plaintext message;
authenticating the decrypted plain text message by comparing the decrypted first digital signature and the concatenated portion of the SIV with a second digital signature associated with the local SIV maintained by the decryption circuit;
after authenticating the decrypted plaintext message, incrementing, by the decryption circuit, the local SIV; and
transmitting, with the second processor component and via the communications channel to the first processor component, the local SIV to enable the encryption circuit to use the local SIV as the SIV in the encryption circuit.

2. The method of claim 1, wherein generating the second digital signature comprises using a message authentication code (MAC) of the decrypted plaintext message.

3. The method of claim 1, wherein generating the first digital signature comprises using a message authentication code (MAC) of the plaintext message.

4. The method of claim 1, further comprising:
incrementing, by the encryption circuit, the SIV after the ciphertext is transmitted to the decryption circuit.

5. The method of claim 1, further comprising:
extracting, with the decryption circuit, a portion of the local SIV; and
comparing, with the decryption circuit, the portion of the local SIV with the portion of the SIV concatenated to the ciphertext.

6. The method of claim 5, wherein decrypting the ciphertext occurs when the portion of the local SIV matches the portion of the SIV concatenated to the ciphertext.

7. The method of claim 5, further comprising:
when the portion of the local SIV does not match the portion of the SIV concatenated to the ciphertext, determining, with the decryption circuit, a difference between the portion of the local SIV and the portion of the SIV concatenated to the ciphertext.

8. The method of claim 7, decrypting the ciphertext occurs when the difference is less than a threshold and after the decryption circuit increments the portion of the local SIV by a quantity to match the portion of the SIV concatenated to the ciphertext.

9. The method of claim 8, wherein the decryption circuit further increments the local SIV by the same quantity as the portion of the local SIV is incremented.

10. The method of claim 7, further comprising:
when the difference is greater than a threshold, beginning, by the encryption circuit and the decryption circuit, a new encryption and decryption session.

11. An authenticated encryption and decryption system, the system comprising:
a first processor component and a second processor component, the first processor component having an encryption circuit configured to:
generate a first digital signature associated with a secure initialization vector (SIV);
concatenate the first digital signature to a plaintext message to generate a concatenated message;
encrypt the concatenated message into a ciphertext;
extract a portion of the SIV; and
concatenate the extracted portion of the SIV to the ciphertext; and
transmit, via a communications channel and to a second processor component, the ciphertext and the concatenated portion of the SIV to enable a decryption circuit of the second processor component to authenticate plaintext messages;
the decryption circuit is configured to:
generate a local SIV;
decrypt the ciphertext into a decrypted first digital signature and a decrypted plaintext message;
authenticate the decrypted plain text message by comparing the decrypted first digital signature and the concatenated portion of the SIV with a second digital signature associated with the local SIV maintained by the decryption circuit;
after authenticating the decrypted plaintext message, increment the local SIV; and
transmit, via the communications channel and to the first processor component, the local SIV to enable the encryption circuit to use the local SIV as the SIV in the encryption circuit.

12. The system of claim 11, wherein the decryption circuit generates the second digital signature by using a message authentication code (MAC) of the decrypted plaintext message.

13. The system of claim 11, wherein the encryption circuit generates the first digital signature by using a message authentication code (MAC) of the plaintext message.

14. The system of claim 11, wherein the encryption circuit increments the SIV after the ciphertext is transmitted to the decryption circuit.

15. The system of claim 11, wherein the decryption circuit extracts a portion of the local SIV and compares the portion of the local SIV with the portion of the SIV concatenated to the ciphertext.

16. The system of claim 15, wherein when the portion of the local SIV matches the portion of the SIV concatenated to the ciphertext, the decryption circuit decrypts the ciphertext.

17. The system of claim 15, wherein when the portion of the local SIV does not match the portion of the SIV concatenated to the ciphertext, the decryption circuit determines a difference between the portion of the local SIV and the portion of the SIV concatenated to the ciphertext.

18. The system of claim 17, wherein when the difference is less than a threshold, the decryption circuit increments the portion of the local SIV by a quantity to match the portion of the SIV concatenated to the ciphertext, and decrypts the ciphertext.

19. The system of claim 18, wherein the decryption circuit further increments the local SIV by the same quantity as the portion of the local SIV is incremented.

20. The system of claim 17, wherein when the difference is greater than a threshold, the encryption circuit and the decryption circuit begin a new encryption and decryption session.

21. A non-transitory computer-readable storage medium comprising instructions that, when executed, cause a first processor component and a second processor component of a system to:
with an encryption circuit of the first processor component:
generate a first digital signature associated with a secure initialization vector (SIV);
concatenate the first digital signature to a plaintext message to generate a concatenated message;
encrypt the concatenated message into a ciphertext;
extract a portion of the SIV; and
concatenate the extracted portion of the SIV to the ciphertext; and
transmit, via a communications channel and to a second processor component, the ciphertext and the concatenated portion of the SIV to enable a decryption circuit of the second processor component to authenticate plaintext messages; and
with a decryption circuit of the second processor component:
generate a local SIV;
decrypt, the ciphertext into a decrypted first digital signature and a decrypted plaintext message;
authenticate the decrypted plain text message by comparing the decrypted first digital signature and the concatenated portion of the SIV with a second digital signature associated with the local SIV maintained by the decryption circuit;
after authenticating the decrypted plaintext message, increment the local SIV; and
transmit, via the communications channel and to the first processor component, the local SIV to enable the encryption circuit to use the local SIV as the SIV in the encryption circuit.

22. The non-transitory computer-readable storage medium of claim 21, wherein the decryption circuit generates the second digital signature by using a message authentication code (MAC) of the decrypted plaintext message.

* * * * *